US008676932B2

(12) United States Patent
Bhatti

(10) Patent No.: US 8,676,932 B2
(45) Date of Patent: Mar. 18, 2014

(54) SYSTEM AND METHOD FOR AUTOMATIC DISTRIBUTION AND STORAGE OF DIGITAL MEDIA

(75) Inventor: Shahzad Bhatti, Tustin, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1566 days.

(21) Appl. No.: 11/714,504

(22) Filed: Mar. 6, 2007

(65) Prior Publication Data

US 2008/0222071 A1    Sep. 11, 2008

(51) Int. Cl.
*G06Q 10/06* (2012.01)

(52) U.S. Cl.
USPC ........... 709/219; 709/220; 709/227; 709/231; 707/790

(58) Field of Classification Search
USPC .................. 709/219, 220, 227, 231; 707/790
See application file for complete search history.

(56) References Cited

U.S. PATENT DOCUMENTS

| | | | |
|---|---|---|---|
| 8,069,264 B2* | 11/2011 | Smith et al. | 709/231 |
| 8,386,633 B2* | 2/2013 | Smith et al. | 709/231 |
| 2004/0116118 A1* | 6/2004 | Karaoguz et al. | 455/432.3 |
| 2006/0015624 A1* | 1/2006 | Smith et al. | 709/227 |
| 2007/0088832 A1* | 4/2007 | Tsang et al. | 709/227 |
| 2012/0016968 A1* | 1/2012 | Smith et al. | 709/219 |

OTHER PUBLICATIONS

Competitor product: HP Instant Share. See: "HP Instant Share Technology FAQ" and "Setting Up Instant Share" as printed on Feb. 25, 2010 from HP Customer Care website: http://h10025.www1.hp.com/ewfrf/wc/document?lc=en&dlc=en&cc=us&docname=c00180536.

* cited by examiner

*Primary Examiner* — Khanh Dinh
(74) *Attorney, Agent, or Firm* — IP Investment Law Group

(57) ABSTRACT

In general, aspects of the invention relate to the automatic distribution and storage of digital media. Specifically, the invention relates to the automatic distribution and storage of digital media in the home environment. In one embodiment, a system and method are provided for retrieving data objects from sources like digital media input devices and sending those objects to destination digital media input devices.

24 Claims, 10 Drawing Sheets

SYSTEM AND METHOD FOR AUTOMATIC DISTRIBUTION AND STORAGE OF DIGITAL MEDIA

BACKGROUND OF THE INVENTION

1. Field of the Invention

The invention relates to the distribution of digital media. More particularly, the invention relates to the distribution of digital media in the home.

2. Description of the Related Technology

Business operations are often analyzed with respect to workflow. In short, workflow is the movement of documents and/or tasks through a work process. More particularly, workflow describes the entry of inputs, work performed on those inputs, and the resulting exit of any outputs. Traditional business analysis tools and/or techniques analyze businesses in terms of workflow. Workflow can capture a business process and may consist of document management, content management, and routing. Because of the increase in digital media, much workflow relates to digital content.

The increase of digital and electronic media in the home gives rise to an opportunity to apply workflows to the home.

SUMMARY OF CERTAIN INVENTIVE ASPECTS

In general, aspects of the invention relate to the automatic distribution and storage of digital media. Specifically, the invention relates to the automatic distribution and storage of digital media in the home environment.

One aspect is a method of executing a home flow project comprising identifying, based on identification rules, a data object at a source input address, wherein digital media is stored at the source input address; extracting the data object from the source input address; and sending the data object to a destination input address.

Another aspect is a method of executing a home flow project comprising receiving an indication to execute a home flow project; extracting a data object from a source input address, wherein digital media is stored at the source input address; and sending, based on delivery instructions, the data object to a plurality of destination input addresses.

Yet another aspect is a method of storing home flow profiles comprising initiating a home flow profile, the home flow profile being associated with a data object type; associating a source input address with the home flow profile, the associating comprising information sufficient to locate a first input device, the source input device configured to receive instances of the data object type; associating rules with the home flow profile, said rules identifying instances of the data object type at the source input address; associating a destination input address with the home flow profile, wherein the association comprises information sufficient to locate a second input device, the second input device configured to receive instances of the data object type; and storing the home flow profile in a data storage.

Yet another aspect is a system for executing home flow projects comprising a configuration module configured to define a home flow profile associated with a data object type, wherein the home flow profile comprises identification rules for identifying instances of the data object type associated with at least one source input location, wherein the source input location stores digital media; and an execution module configured to receive and to process a specification for a respective home flow project, wherein the specification defines the home flow profile and further defines at least one destination input location, wherein the destination input location stores digital media, wherein the execution module is further configured to extract at least one instance of the data object type, based on the identification rules, and to deliver the at least one instance to the at least one destination input location.

DETAILED DESCRIPTION OF CERTAIN INVENTIVE EMBODIMENTS

Figure 1A:
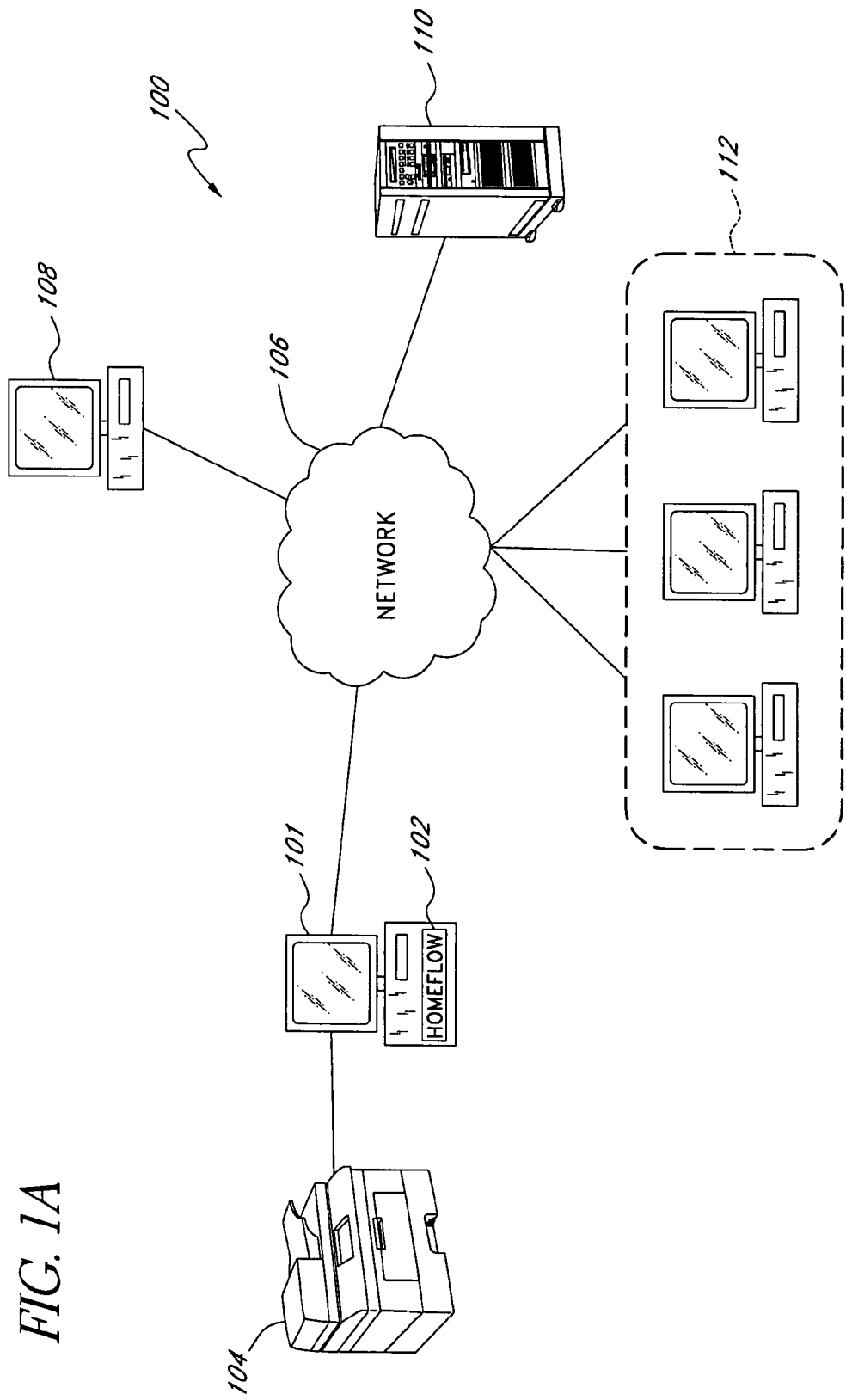
FIG. 1A is a block diagram that illustrates one embodiment of a system in which a Home Flow application may be implemented.

Various aspects and features of the invention will become more fully apparent from the following description and the pending claims taken in conjunction with the foregoing drawings. In the drawings, like reference numerals indicate identical or functionally similar elements. The drawings, associated descriptions, and specific implementation are provided to illustrate the embodiments of the invention and not to limit the scope of the disclosure.

In general, the invention relates to methods, systems, and software for implementing electronic media Home Flows. The rise of digital media at home presents new and innovative opportunities to create "Home Flows" for enriching the life of social processes at home. Home Flows are unique with respect to the kinds of processes each captures and automates. Home Flows capture human social process and are geared toward sharing and connecting at a personal level. Home users may be able to share their life experiences according to a sequence of steps with, potentially, a single action. For example, if a user defines the Home Flow as: (1) scan the recipe, (2) forward to a list of friends and family, (3) file the recipe in a shared folder for future reference, and (4) post it to their home website. In this example, the user will be able to perform all of the steps of the Home Flow with the push of a button at the MFP. A Home Flow editor will guide the user through the definitions of the various steps.

Home Flows provide the user with a set of tools and capabilities, similar in some respects to those available to business users for a long period of time, to increase productivity and efficiency at home. A user may create a Home Flow once and then use it over and over again, sharing life experiences and automating the collection, processing, and dissemination of information to friends and family. Because Home Flows may be established norms, they may be created once and distributed for use once the user has created a Home Flow. Unvarying and standardized processes at home involving digital media may be automatically created and executed with minimal user interaction. In one embodiment, the method provides extraction of complexity in a simple "select and submit" method. In one embodiment, Home Flow may be implemented as a stand alone application running on a personal computer connected to a network and a home scanning device.

In one embodiment, a Home Flow application may be programmed such that, whenever a data storage device (e.g., a USB memory device, a storage device using IEEE 1394, and so forth) is connected, the Home Flow application searches for a particular type of file (or other data object) on the device, such as a text, image, sound, video, and/or graphic file, and then delivers the identified files (or other data objects) to a specified destination location. In another embodiment, a Home Flow application may be programmed such that, whenever a user scans, for example, a document with a unique identifier, such as a bar code, the Home Flow application associates the document with a particular Home Flow profile and reads the form for information, including, for example, a list of destination locations to which a corresponding, successive scanned image (or images) should be sent. In another embodiment, a Home Flow application may be programmed to implement a user interface that allows an administrator to define certain Home Flow profiles, and also allows users to submit specifications of Home Flow projects for the respective profiles. The profiles may include, for example, a list of possible sources and destinations for particular data objects (such as, recipes, photos, and so forth). The project specification may include a desired subset of the possible sources and destinations for a particular data object. For example, if a scanner and a USB drive are available as possible sources and an email list, a Web site, and a shared folder location are available as destinations (as defined by a respective profile), then a project specification may define that the Home Flow application take the relevant data objects from the USB drive and send them to the members of the email list and to the shared folder. As illustrated in more detail below, there are many suitable ways to implement Home Flows.

FIG. 1A illustrates one embodiment of a system in which a Home Flow application may be implemented. In the illustrated embodiment, system 100 is a networked community. Personal computer (PC) 101 is a typical computing device used in the home. PC 101 is equipped with Home Flow application 102. In other words, Home Flow application 102 is stored and executed on PC 101. Home Flow application 102 manages the Home Flows for the respective household. PC 101 is connected to a digital media input device, multi-function peripheral (MFP) 104. MFP 104 includes a scanner. Users of Home Flow application 102 may, for example, scan digital media through MFP 104, which, in some embodiments, may initiate a Home Flow project. In alternative embodiments, Home Flow application 102 may be stored on devices external to PC 101, and may be executed on PC 101. PC 101 and MFP 104 may represent a personal computing system within a home. The family of users may access PC 101 and MFP 104 in order to execute various Home Flow projects, such as sharing recipes, albums, scrapbooks, and news within the home or with remote family members, friends, and associates accessible in the networked community.

Although embodiments of the invention do not necessarily include multi-function peripherals (MFPs), some embodiments may include MFPs. A multi-function peripheral (MFP) device is an integrated device configured to perform two or more functions, including without limitation scanning, copying, printing, faxing, combinations of the same and the like. The functionality of an MFP device may be accessed over a network, including, for example, the Internet or a LAN, or at the device itself. An MFP device may be configured with sufficient memory to queue jobs waiting to be processed. It will be appreciated that MFP devices may be configured to perform in a variety of different networked and standalone computing environments.

PC 101 is connected to a network 106. In the illustrated embodiment, network 106 may be the Internet. In other embodiments, network 106 may be a local intranet, a local area network (LAN), a wide area network (WAN), a wireless network, a home network, and so forth. Network 106 is connected to various digital media input devices, including remote PC 108, Web server 110, and network 112. Certain Home Flow projects may send digital media to the various digital media input devices. For example, a user of Home Flow application 102 may specify a Home Flow project that scans photographs through MFP 104 and delivers the resulting digital photographic images to an email address accessed by a user of remote PC 108, to a Web server 110 that places the digital photographic images on a website, such as a personal or family Web log hosted by an Internet Service Provider (SP), and to a mailing list of email accounts represented by network 112, for example, an email mailing list of family and friends known to the user of PC application 102.

Figure 1B:
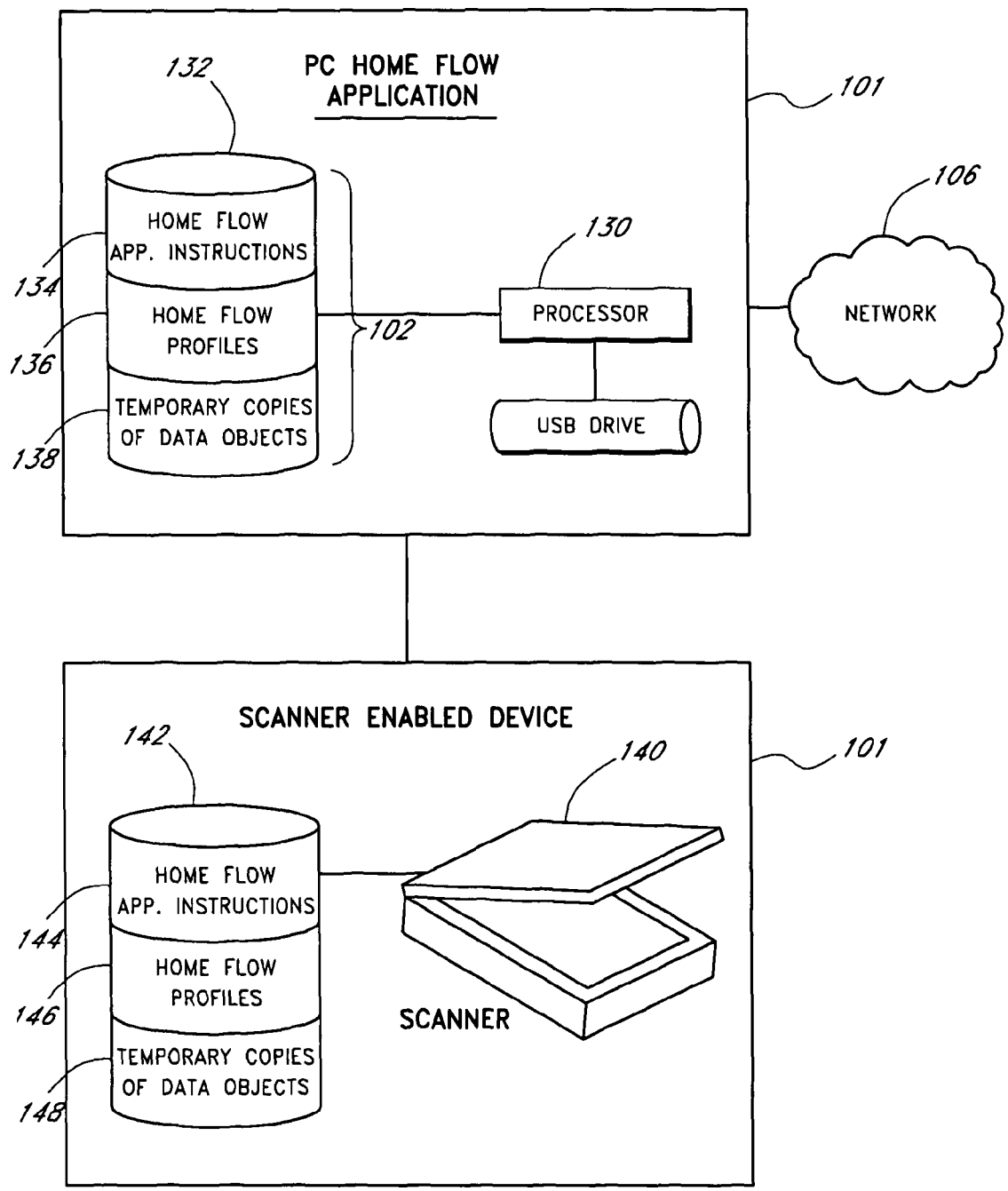
FIGS. 1B and 1C are block diagrams that illustrate embodiments of a Home Flow application.

FIG. 1B illustrates PC 101 and MFP 104 in more detail. PC 101 includes a processor 130 for executing Home Flow application 102. PC 101 also includes a storage device 132 that stores Home Flow application instructions 134, Home Flow profiles 136, and temporary copies of data objects 138, which collectively comprise Home Flow application 102. Home Flow application instructions 134 are the instructions for executing the Home Flow application 102. Home Flow profiles 136 include the user-specified and/or administrator-specified information that define individual Home Flow projects that may be executed by the Home Flow application 102. In general, a Home Flow profile refers to a general type of Home Flow. For example, a "share recipes" Home Flow is an example of a type of Home Flow. A "share recipes" profile might define the possible configurations of Home Flow projects that enable a user to share recipes. A Home Flow profile may define possible source and destination locations for various data objects manipulated by a particular Home Flow, including identification rules and delivery instructions for retrieving and sending, respectively, those various data objects. Typically, a Home Flow project is an instance of a Home Flow for a given profile. For example, a user may execute a Home Flow project of the "share recipes" type (or profile). The project may specify that recipes are to be taken from a scanner and sent to a Web server for inclusion in a Web log. Another Home Flow project of the same type (or profile) may specify that recipes are to be taken from a USB drive (not shown) and sent to a mailing list of family and friends of the user. Temporary copies of data objects 138 are the data objects retrieved from the source locations and subsequently delivered to the destination locations.

In the illustrated embodiment, MFP 104 comprises a scanner device 140. MFP 104 also comprises a local storage device 142, which may include Home Flow application instructions 144, Home Flow profiles 146, and temporary copies of data objects 148. In other embodiments, the local storage device 142 may store just the temporary copies of data objects 148. In still other embodiments, the local storage device 142 may include only a subset of the Home Flow application instructions 134 and/or a subset of Home Flow profiles 146, or may include a different set of data. Although in some embodiments the PC 101 and MFP 104 comprise, respectively, different Home Flow application instructions, Home Flow profiles, and/or temporary copies of data objects, in other embodiments the various data elements, respectively, may be distributed exclusively on PC 101 and/or MFP 104.

Figure 1C:
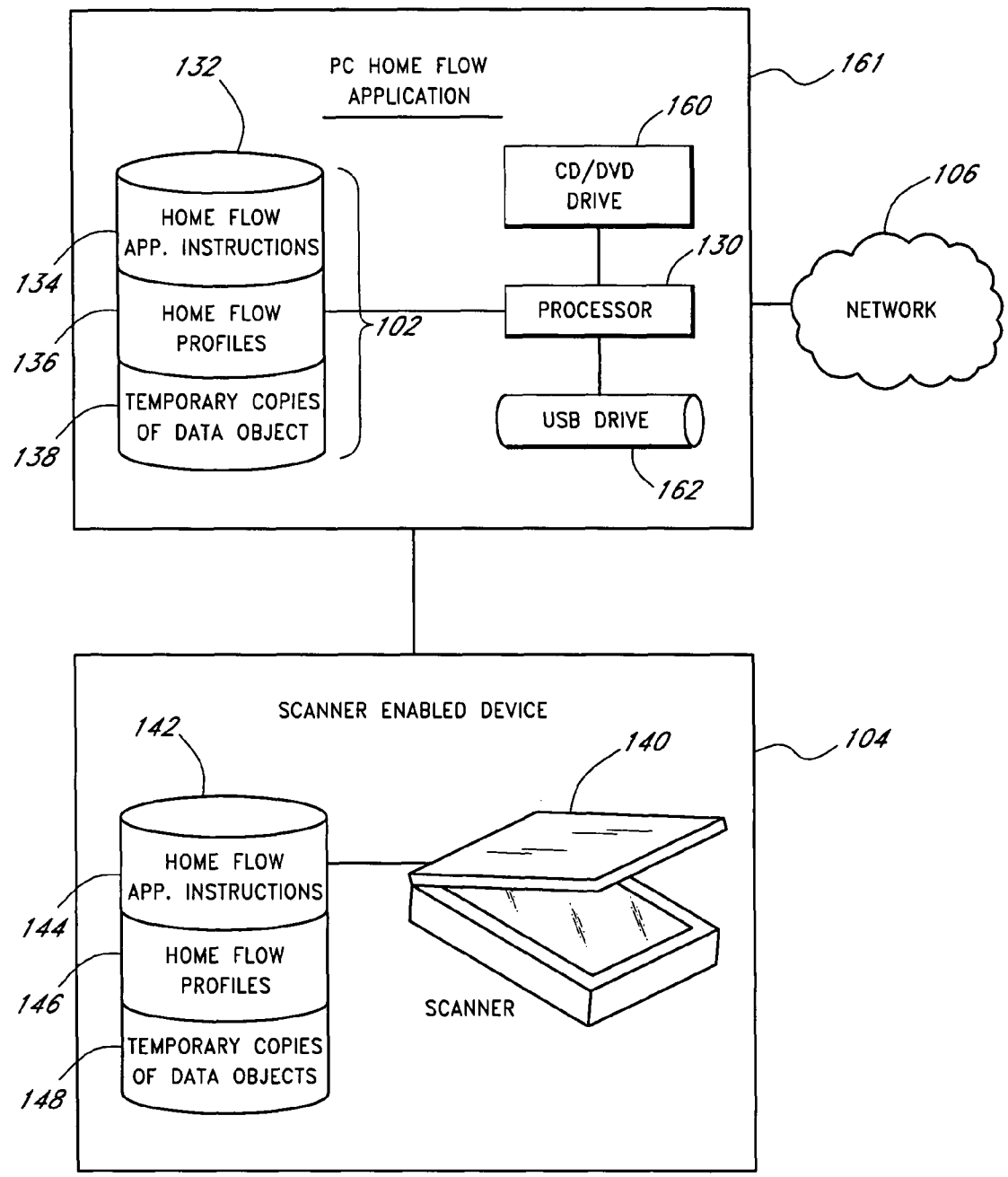

FIG. 1C illustrates another embodiment. MFP 104 is the same as MFP 104 illustrated in FIG. 1B. PC 161, however, is configured also with a CD/DVD drive 160 and a USB drive 162. These alternative digital media input devices, CD/DVD drive 160 and USB drive 162, provide additional source locations from which to retrieve data objects for a particular Home Flow project. Additionally and/or alternatively, CD/DVD drive 160 and USB drive 162 may be additional destination locations for a particular Home Flow project. Furthermore, in some embodiments, storage device 132 may also serve as a source and/or destination location for a particular Home Flow project. It will be appreciated by one skilled in the art that there are many ways to configure a personal computer with various suitable source and destination digital media input devices. In general, a digital media input device is any suitable device that can store, temporarily or permanently, an electronic file. Digital media input devices may be equipped to store, temporarily or permanently, text, sound, graphic, image, and/or video files, for example. Scanners, faxes, MFPs, USB drives, hard-disk drives, CD/DVD drives, Web logs, Web sites, file transfer protocol (FTP) sites, hypertext transfer protocol (HTTP) sites, and so forth, are examples of digital media input devices.

Figure 2A:
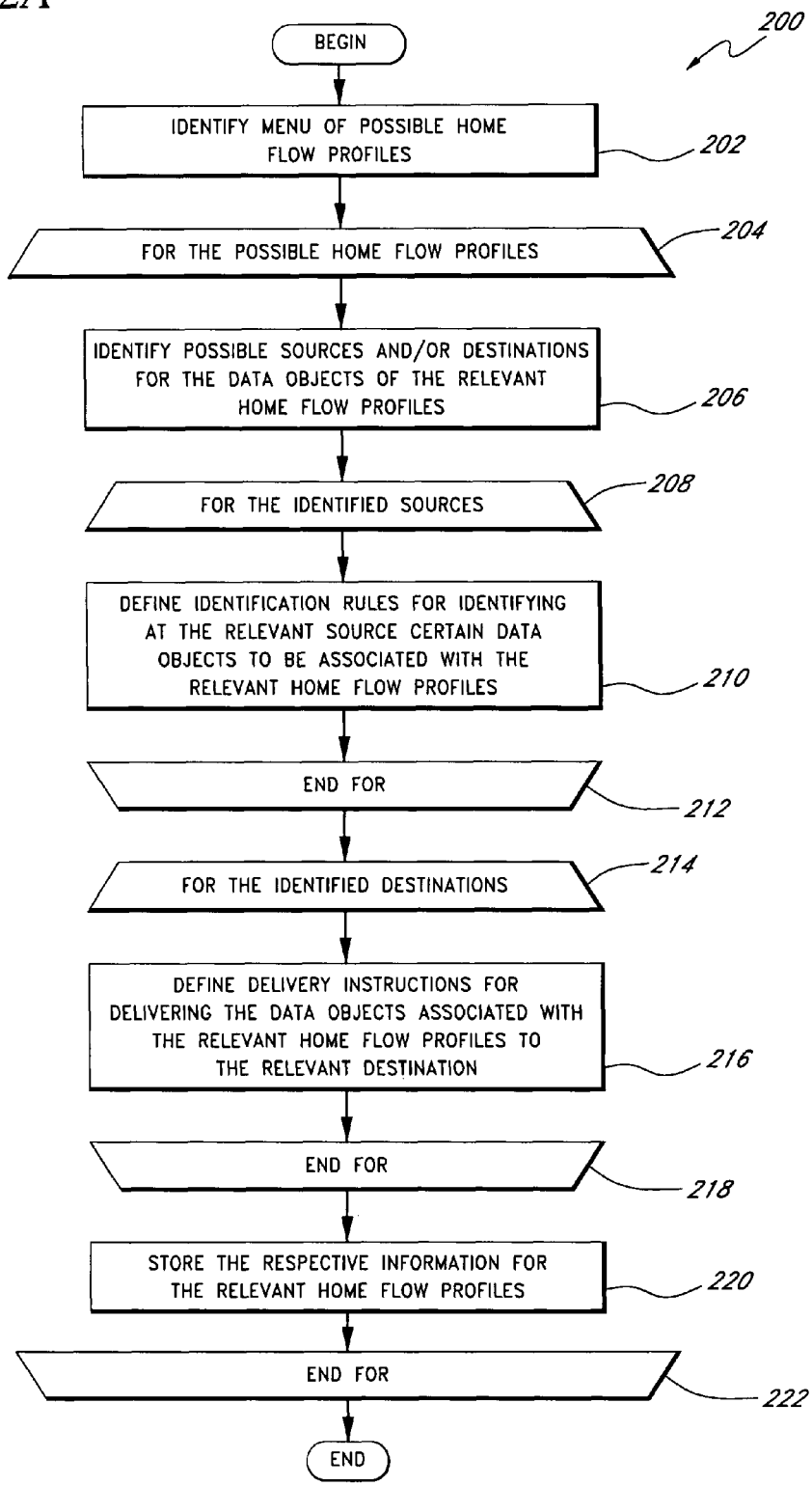
FIG. 2A is a flowchart of one embodiment of a configuration module for a Home Flow application.

FIG. 2A illustrates one embodiment of a configuration module 200 for a Home Flow application. The configuration module 200 may be a subset of the Home Flow application instructions 134. In many embodiments, the configuration module 200 may be managed by an administrator of the Home Flow application. In a home environment, the administrator of the Home Flow application may be, for example, a family member with expertise in the home computing network. The configuration of the Home Flow application may be administered to simplify the tasks of other members of the family and/or household who may be less technically inclined. In one embodiment, the configuration module 200 may, for example, allow an administrator to define certain Home Flow profiles. In other embodiments, the configuration module 200 may be managed by a commercial or other non-home entity that manages the Home Flows for a household. In some embodiments, there may be no configuration module. Instead, the Home Flow application may come with certain preset profiles that define the possible Home Flow projects that may be executed. It will be appreciated that there are many suitable ways for a configuration module to define Home Flow profiles, including, for example, defining Home Flow profiles via a home flow editor application, a scanned form, an email, a user interface, an event message, a voice command, a Web-enabled user interface, and a local client.

In state 202, the configuration module prompts the user to identify a menu of possible Home Flow profiles. The Home Flow profiles define the available sources and destinations for a particular Home Flow project. Additionally and/or alternatively, Home Flow profiles identify the types of data objects being manipulated in the relevant Home Flow projects. For example, the following may be possible Home Flow profiles: share recipes, share album, create home movie, create scrapbook, create album, and post news. The relevant data objects of the "share recipes" profile may be a text file identifiable as a recipe, for example. The relevant data objects of the "share album" and "create album" profiles may be an image file, for example. The relevant data objects of a "create scrapbook" profile may be a combination of text, image, sound, graphic, and/or video files, for example. The relevant data objects of a "post news" profile may be text files, for example. It will be appreciated by one skilled in the art that there are many suitable Home Flow profiles that may be configured. In some embodiments, the Home Flow application 102 may come equipped with a fixed menu of possible Home Flow profiles. In other embodiments, a Home Flow application 102 may allow a user to create their own user-defined profiles.

The configuration module executes the commands between states 204 and 222 for the possible Home Flow profiles, which are identified in state 204. In state 206, the administrator identifies possible sources and/or destinations for the data objects of the relevant Home Flow profile. For example, if the administrator is configuring the "share recipes" profile, then the administrator may identify the possible sources and/or destinations for retrieving and delivering recipes, respectively. After the administrator specifies the possible sources and/or destinations for the data objects of the relevant Home Flow profile, the administrator enters information for the identified sources, in state 208, and for the identified destinations, state 214. For the identified sources, the Home Flow application executes the states in between state 208 and state 212.

In state 210, the administrator defines the identification rules for identifying the relevant source data objects to be associated with the relevant Home Flow profile. In the illustrated embodiment, identification rules provide semantic guidelines for a Home Flow application to evaluate the data objects at the source location to determine which, if any, data objects meet the semantic description of the data object type corresponding to a particular Home Flow profile. For example, if the relevant Home Flow profile is the "share recipes" profile, then an administrator may define identification rules for identifying recipes at the identified sources. In one embodiment, if the identified source is a USB drive, then the identification rules may define certain file characteristics that indicate that a particular file includes (or likely includes) recipes. The rules may be based on, for example, type (such as file type), size (such as file size), date (such as date of creation or modification), time (such as time of creation or modification), location, and metadata. Additionally and/or alternatively, if the identified source is a scanner, then the identification rules may determine whether a scanned image is a recipe. A Home Flow application may use optical character recognition (OCR) software to translate an image to text and then look for certain text code that indicates a recipe. In other embodiments, identification rules may identify relevant data objects by such identifying characteristics as: bar code, signature, digital signature, image, phone number, picture, number, mark, fingerprint, iris pattern, and voice pattern. Although in the illustrated embodiment the user indicates a desire to execute a Home Flow project before any data objects are identified as belonging to the relevant project, in other embodiments the recognition of a particular identifying characteristic may signal to the Home Flow application that a Home Flow project is desired. Furthermore, there are various suitable ways in which the identification rules may be defined. For example, the Home Flow application may provide default identification rules stored in memory, may provide a user interface to request and receive identification rules, and/or may be configured to receive identification rules from a scanned image, an email message, an event message, and/or other electronic messages suitable for providing identification rules.

In some embodiments, the rules for identifying a particular data object may be the same for all sources. In other embodiments, the rules for identifying data objects may be different for various sources. In other words, a home flow profile may include a set of possible source digital media input locations that are associated with a respective subset of the identification rules based on the applicability of the respective identification rules to the respective source digital media input locations. Furthermore, in some embodiments, there may be no identification rules. In these embodiments, input from the relevant source may be taken without any screening. For example, if the relevant source is a scanner, then the configuration module may accept input from the scanner with the assumption that it is a recipe.

For the identified destinations, the configuration module executes the states between state 214 and state 218. In state 216, the administrator selects a set of instructions for delivering the data objects associated with the relevant Home Flow profile to the relevant destination. For example, if the Home Flow profile is the "share recipes" profile and the destination is a mailing list, the administrator may select a set of delivery instructions that inform the Home Flow application how to send email messages with the content of the Home Flow project to the members of the mailing list. In addition to defining how to deliver the data object(s) to the respective destination location(s), the delivery instructions may also include instructions for modifying the respective data object(s) before delivery and combining the respective data object(s) with another data object. Furthermore, although in the illustrated embodiment the delivery instructions include information in addition to the address of a destination digital media input device, in other embodiments the delivery instructions may include a list or set of destination addresses without other instructions for delivery. Moreover, there are various suitable ways in which the delivery instructions may be defined. For example, the Home Flow application may provide default delivery instructions stored in memory, may provide a user interface to request and receive delivery instructions, and/or may be configured to receive delivery instructions from a scanned image, an email message, an event message, and/or other electronic messages suitable for providing delivery instructions.

In some embodiments, the delivery instructions may be the same for all destinations. In other embodiments, the delivery instructions may be different for various destinations. In other words, a home flow profile may include a set of possible destination digital media input locations that are associated with a respective subset of the delivery instructions based on the applicability of the respective delivery instructions to the respective destination digital media input locations.

In state 220, the configuration module stores the respective information for the relevant Home Flow profile. In the future, this information may be accessed for a specific Home Flow project that is specified by a user. Although in the illustrated embodiment a configuration module stores certain Home Flow profiles for later use, in other embodiments the information stored in the Home Flow profiles may be entered directly for the respective Home Flow project, as discussed in greater detail below. Moreover, although in the illustrated embodiment, the Home Flow profile information is entered through a configuration module, such as a Home Flow editor application, in other embodiments the information may be entered through a user interface of, for example, an MFP, such as MFP 104, through a form, an email or other electronic transmission, an application event, such as a time event in a calendar application, combinations of the same and the like, and so forth.

A module may be logic embodied in hardware or firmware, or a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM and flash memory. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

Figure 2B:
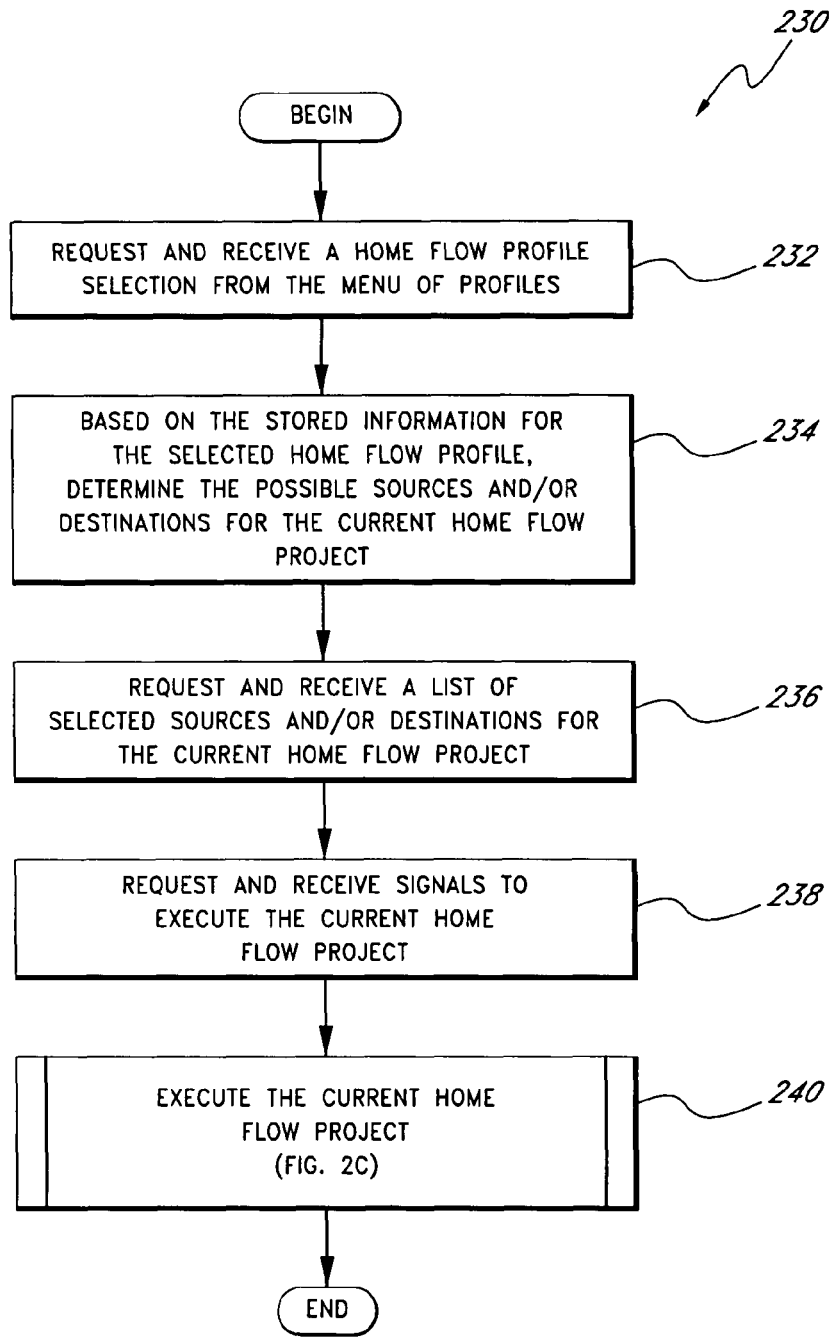
FIGS. 2B and 2C are flowcharts of one embodiment of an execution module for a Home Flow application.

FIG. 2B is a flowchart of one embodiment of a execution module 230 for a Home Flow project. A user interface for such an editor is described in further detail below with respect to FIGS. 3A and 3B. In other embodiments, equivalent and/or similar functionality may be provided by other software editors that receive Home Flow project specifications from users. In general, the execution module 230 assists a user to define a particular Home Flow project specification. In the illustrated embodiment, the user selects a profile, and then selects destination and source digital media input devices. The Home Flow project specification may be received via various suitable ways, including, for example, a home flow editor application, a scanned form, an email, a user interface, an event message, a voice command, a Web-enabled user interface, and a local client. In the illustrated embodiment, the specification is provided via a Web-enabled user interface.

In state 232, the execution module requests and receives a Home Flow profile selection from a menu. As described above, these profiles may include, for example, "share recipes," "share album," "create scrapbook," "create album," and "post news." The menu may be presented to the user or, in other embodiments, the menu may be known in advance by the user or provided in an on-line or off-line help manual, for example. In some embodiments, there may be only one type of Home Flow profile, obviating the use of a menu to select a particular one.

In state 234, the execution module determines the possible sources and/or destinations for the Home Flow project based on the selected Home Flow profile. The execution module makes the determination based on stored information. This information may be stored by a configuration module, such as the configuration module described with reference to FIG. 2A. In some embodiments, the stored information may be information specified by a user and/or administrator in one or more Home Flow profiles. In other embodiments, the stored information may be default information fixed by the Home Flow application. In state 236, the execution module requests and receives a list of selected sources and/or destinations for the selected Home Flow project. In some embodiments, the execution module may provide a menu of the possible sources and/or destinations based on the stored information for the selected Home Flow project. This information may have been stored, for instance, in a Home Flow profile. In some embodiments, the delivery instructions may be the same for all destinations. In other embodiments, the rules for identifying data objects may be different for various sources. In other words, a home flow profile may include a set of possible source digital media input locations that are associated with a respective subset of the identification rules based on the applicability of the respective identification rules to the respective source digital media input locations.

In state 238, the Home Flow editor requests and receives signals to execute the current Home Flow project. There are many suitable ways that a signal may be received, including, for example, screen-button selections, data entry, bar codes, signatures, digital signatures, files, images, phone numbers, pictures, numbers, marks, fingerprints, iris patterns, and voice patterns. In some embodiments, the signals may be the execution of a particular source device. For example, if a scanner is the source digital media input device for the particular Home Flow project, then the signal may be the execution of the scanning feature of the device. Thus, when the scanner captures an image, this may trigger the beginning of the Home Flow project. In some embodiments, the execution module does not request a signal, but merely waits for a signal, such as the execution of the scanning functionality of a scanner or MFP device. In some embodiments, more than one digital input media device may provide the data objects for a Home Flow project. In these embodiments, multiple signals may be received that initiate the respective Home Flow project. In state 240, the Home Flow editor executes the selected Home Flow project. This process is described in more detail with respect to FIG. 2C, described below.

Figure 2C:
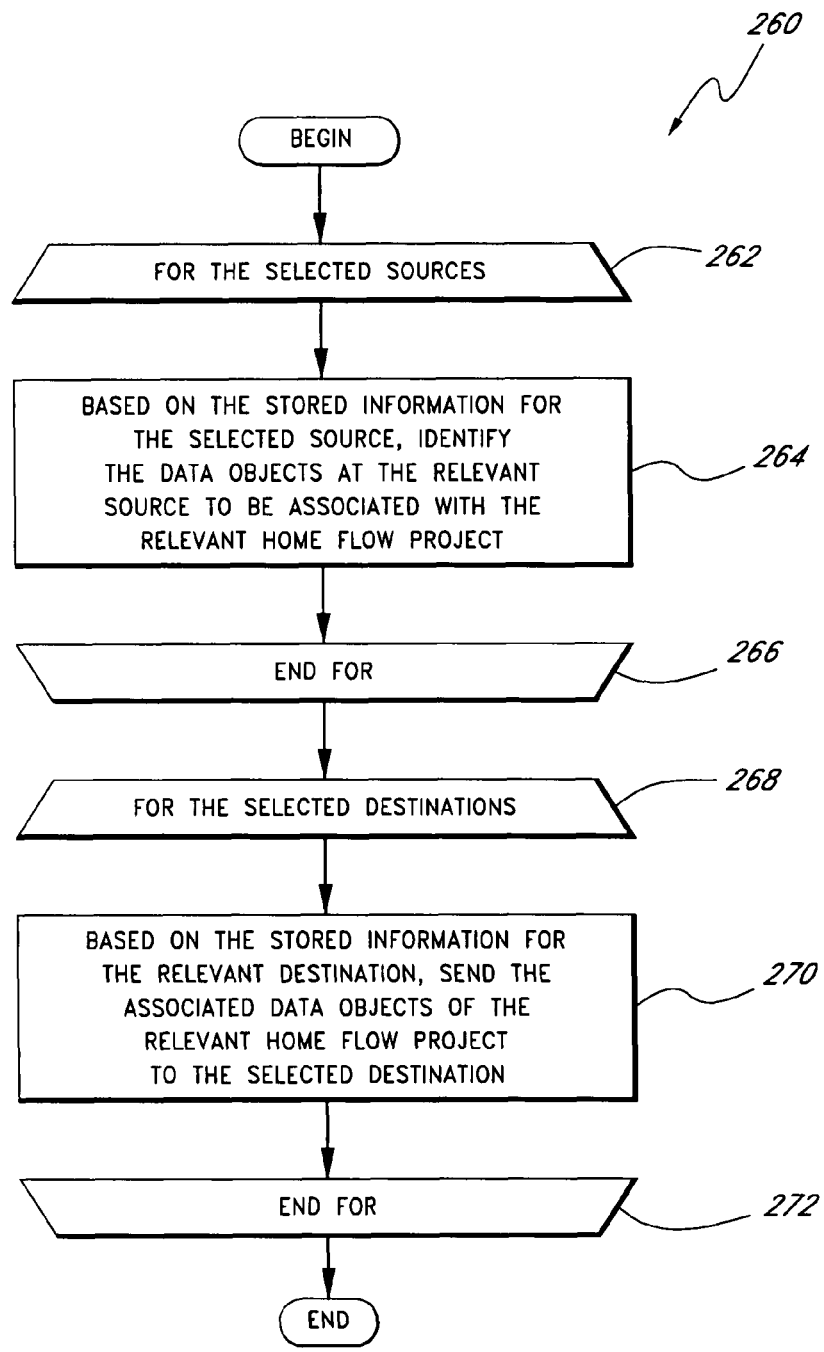

FIG. 2C illustrates a flowchart of one embodiment of the delivery execution of a Home Flow project. The exemplary execution flowchart 260 describes the processes that extract data objects from source digital media input devices and deliver these objects to the destination digital media input devices. The states between state 262 and 266 are executed for the selected source digital media input devices. In state 264, the execution module identifies the data objects stored on the relevant source digital media input device. In some embodiments, the respective Home Flow profile may specify certain identification rules for recognizing the relevant data objects at a particular source location. For example, a "share recipes" Home Flow profile may include identification rules for recognizing recipes. These rules may identify recipes based on various factors including, but not limited to, file type, file size, file date, file time, and file location. If, for example, the source digital input device is a USB drive, then the Home Flow execution module may evaluate all of the files on the drive that meet the criteria established by the rules for the "share recipes" Home Flow profile. Upon identifying all of the qualifying files, the Home Flow execution module may extract those files. In some embodiments, extracting the files (or other data objects) may include copying the relevant files (or other data objects), and leaving the original files (or other data objects) at the source location. In other embodiments, extracting may include removing the relevant files (or other data objects).

The states between state 268 and state 272 are executed for the selected destination digital media input devices. In state 270, the Home Flow execution module sends the data objects of the relevant Home Flow project to the selected destination digital media input device. The objects are sent based on the stored information for the relevant destination digital media input device for the respective Home Flow profile. If, for example, the relevant destination is a mailing list, the respective Home Flow profile may store instructions for delivering the relevant data objects to the members of the mailing list. This may include opening an application interface to an email client and populating email messages with the relevant data objects and sending the respective email messages to the members of the mailing list.

Figure 3A:
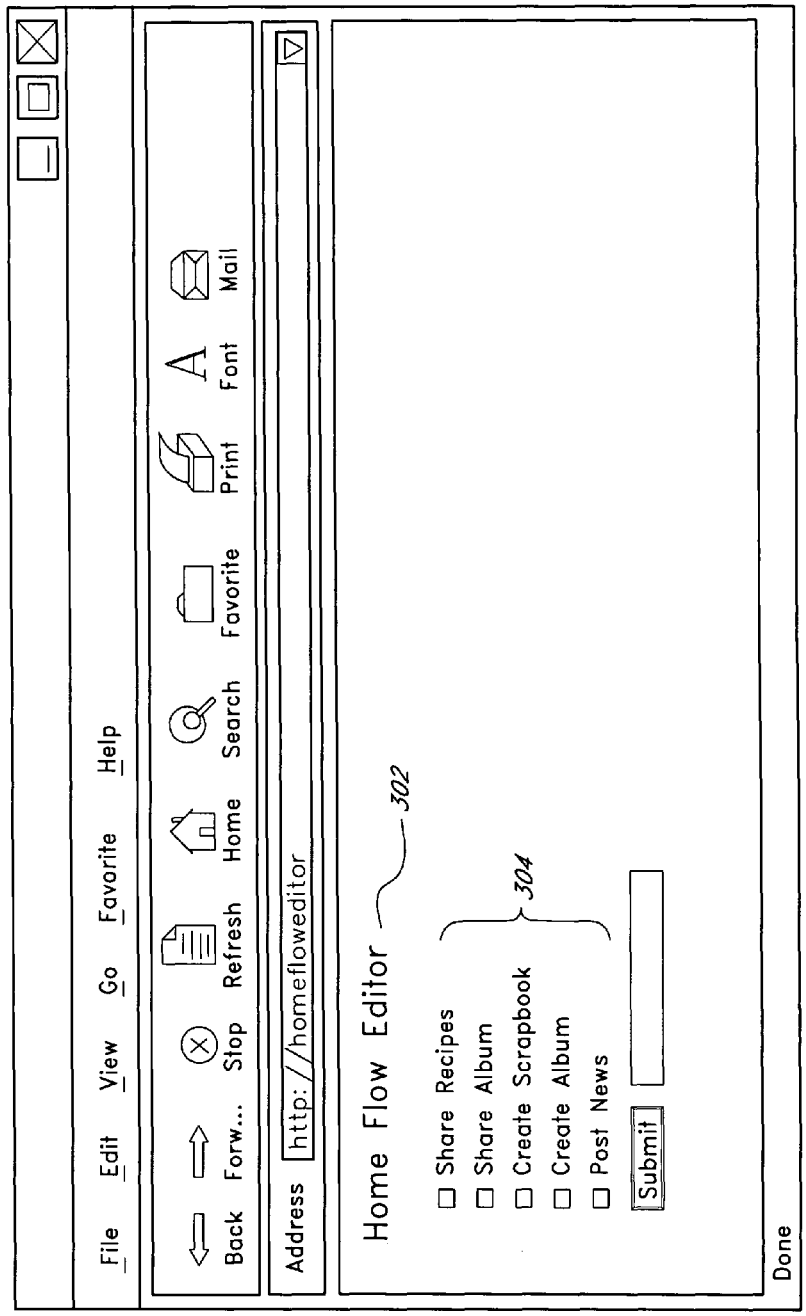
FIGS. 3A and 3B are screen displays that illustrate one embodiment of an interface for a Home Flow editor for specifying a Home Flow project.

FIG. 3A is a screen display that illustrates one embodiment of a Home Flow editor. The browser 300 is navigated to a Home Flow editor site. This site may be available over the Internet, for example, the World Wide Web. In other embodiments, the Home Flow editor may exist on an internal network, including a home network. The Home Flow editor 302 includes on its main page a list of Home Flow profiles. The profiles correspond to Home Flow profiles that may have been configured previously by an administrator, for example. In the illustrated embodiments, the menu of possible Home Flow profiles includes the following: "share recipes," "share album," "create scrapbook," "create album," and "post news." In the illustrated embodiment, the user selects a single Home Flow profile. Once the relevant Home Flow profile has been selected, the project may be specified, including the sources and destinations for the data objects in the project.

Figure 3B:
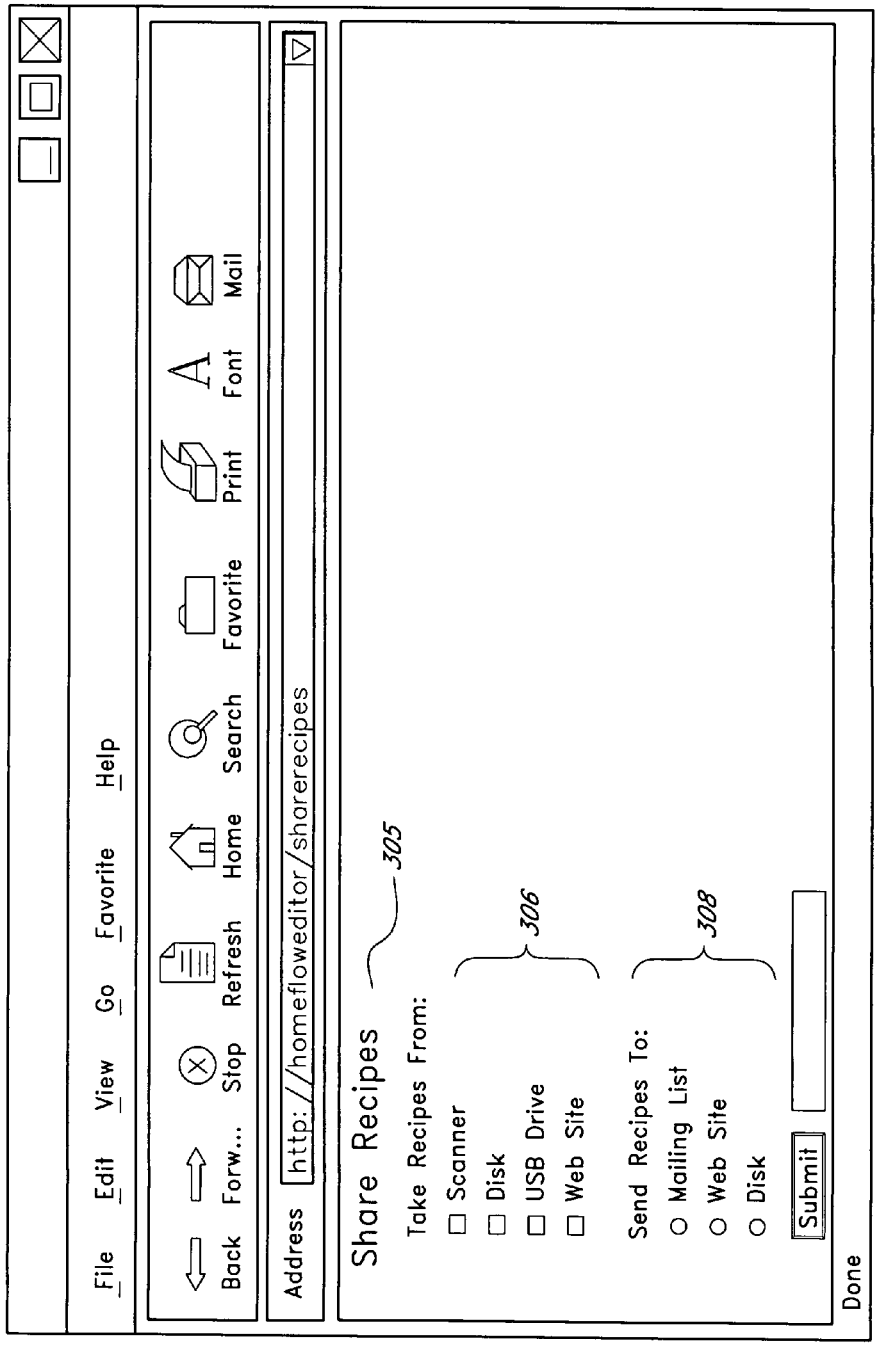

FIG. 3B is a screen display that illustrates one embodiment of a user dialog of a Home Flow editor for the "share recipes" profile. The dialog includes a list of sources 306 and a list of destinations 308. Specifically, the user may choose from the following source locations: scanner, disk, USB drive, and website. The user may choose from the following destinations: mailing list, website, and disk. In the illustrated embodiment, the user may select multiple sources and/or multiple destinations. In other embodiments, the user may be limited to selecting a single source and/or destination.

Although the embodiments described herein employ a Web enabled Home Flow editor, in other embodiments, a local client may be used without connecting to the Internet, or other network.

Figure 3C:
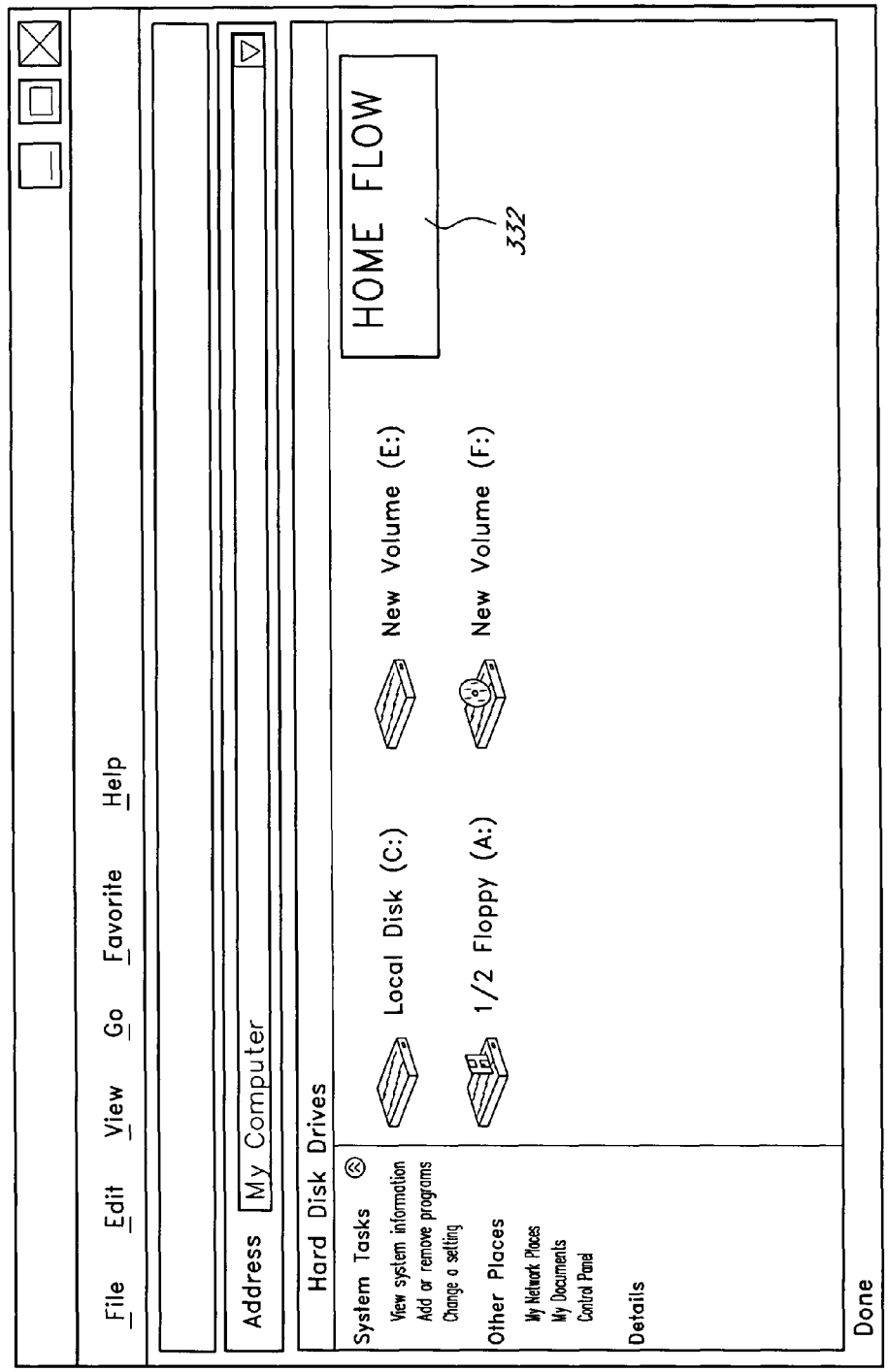
FIG. 3C illustrates a software interface for the execution of Home Flow projects.

FIG. 3C illustrates one embodiment of a Home Flow execution "submit" button. File browser 330 includes different external devices, such as local disk (C:), 1-2 floppy (A), new volume (E), and new volume (F), and Home Flow. The Home Flow external device 332 is a button indicating the initiation of a Home Flow project.

Figure 3D:
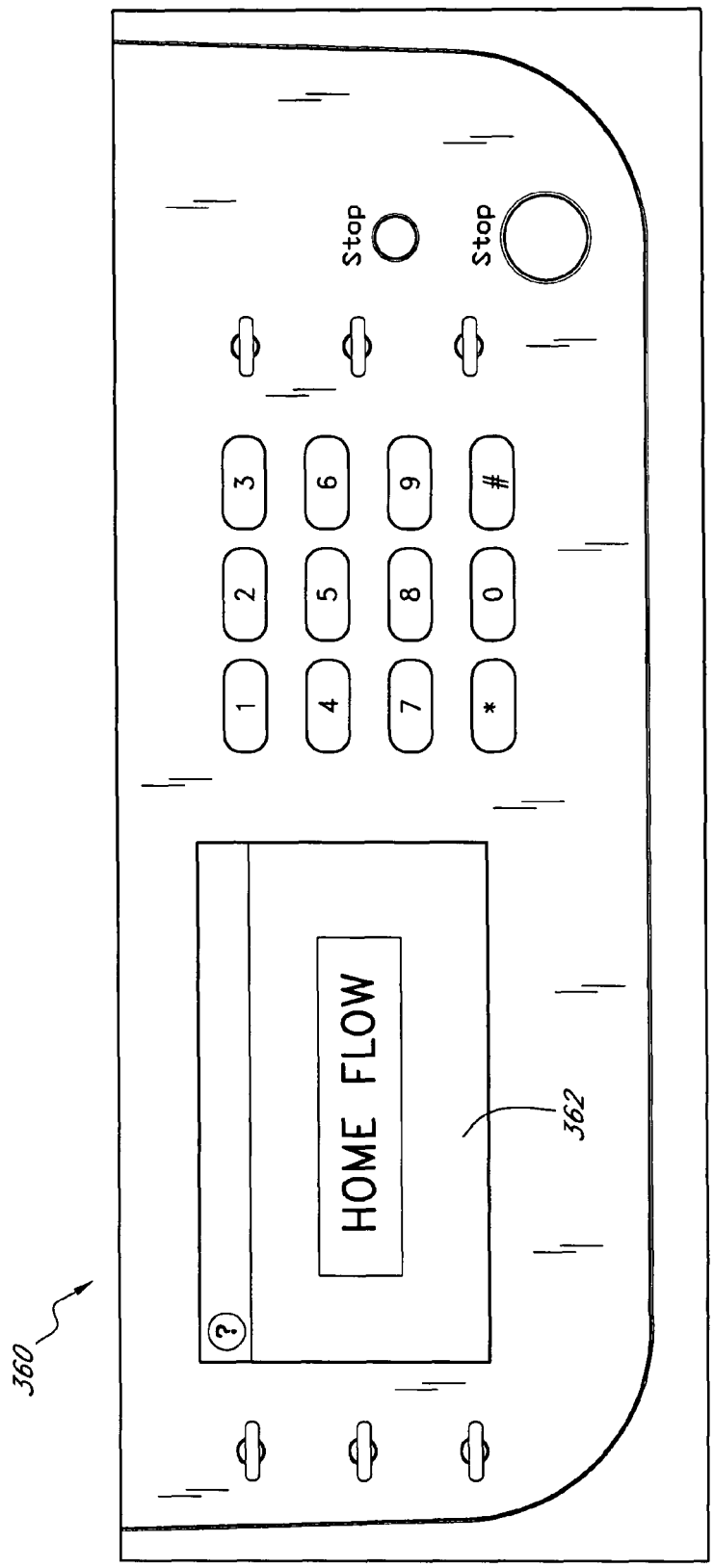
FIG. 3D illustrates a top view of an input panel for the execution of Home Flow projects.

FIG. 3D illustrates one embodiment of a touch-sensitive display panel that provides a Home Flow execution "submit" button. The display panel 360 is programmed to display a Home Flow interface button 362. The button may be displayed after a sequence of menus has been navigated. When the Home Flow execution button 362 is pressed, the Home Flow project is initiated. The Home Flow execution button 362 may be a hardware button that provides an electrical signal to initiate the project. In other embodiments, the Home Flow execution button may be a software button that triggers an electrical signal to initiate the process.

Although the execution "submit" buttons described herein are activated either physically or electronically, in other embodiments the initiation of the Home Flow projects may be initiated with voice commands. Furthermore, it will be appreciated by a skilled technologist that the menu commands of either the configuration and/or execution modules may also be implemented with voice commands.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A method of executing a home flow project, the method comprising:
    associating a plurality of identification rules with the home flow project;
    identifying, based on the identification rules, a data object at a source input address, wherein digital media is stored at the source input address;
    extracting the data object from the source input address; and
    sending the data object to a destination input address, wherein the identification rules evaluate data objects at the source input address to determine which, if any, data object meets a semantic description of a data object type corresponding to the home flow project.

2. The method of claim 1, wherein the identified data object is one of the following: a recipe, a photograph, a movie, an album, a scrapbook, and a news post.

3. The method of claim 1, wherein the identification rules identify the data object based on at least one of the following: type, size, date, time, location, and metadata.

4. The method of claim 1, wherein the source input address is associated with at least one of the following: a scanner, a fax, a multi-function peripheral (MFP), a disk drive, a USB drive, a storage device using IEEE 1394, a CD/DVD drive, a Web log, a Web site, a Uniform Resource Locator, a File Transfer Protocol site, and a Hypertext Transfer Protocol site.

5. The method of claim 1, further comprising one of the following: storing the identification rules, requesting and receiving identification rules through a user interface, receiving identification rules from a scanned image, receiving identification rules from an email message, receiving identification rules from an event message, and receiving identification rules from an electronic message.

6. The method of claim 1, wherein identifying, based on identification rules, a data object at a source input address comprises recognizing a data object with at least one of the following identifying characteristics: text code, bar code, signature, digital signature, image, phone number, picture, number, mark, fingerprint, iris pattern, and voice pattern.

7. A non-transitory computer readable medium having stored thereon machine loadable software for executing home-flow projects on multi-function peripherals (MFPs) which, when executed on a machine, causes the machine to perform the method comprising:
associating a plurality of identification rules with the home flow project;
identifying, based on the identification rules, a data object at a source input address,
wherein digital media is stored at the source input address;
extracting the data object from the source input address; and
sending the data object to a destination input address,
wherein the identification rules evaluate data objects at the source input address to determine which, if any, data object meets a semantic description of a data object type corresponding to the home flow project.

8. A method of executing a home flow project, the method comprising:
receiving an indication to execute a home flow project;
identifying, based on identification rules associated with the home flow project, a data object at a source input address;
extracting a data object from a source input address, wherein digital media is stored at the source input address; and
sending, based on delivery instructions, the data object to a plurality of destination input addresses, wherein digital media is stored at the destination input addresses,
wherein the identification rules evaluate data objects at the source input address to determine which, if any, data object meets a semantic description of a data object type corresponding to the home flow project.

9. The method of claim 8, wherein the extracted data object comprises at least one of the following file types: text, image, sound, video, and graphic.

10. The method of claim 8, wherein the delivery instructions include at least one of the following: modifying the data object, combining the data object with another data object, and specifying the plurality of destination digital media input addresses.

11. The method of claim 8, wherein the destination input address is associated with at least one of the following: a scanner, a fax, a multi-function peripheral (MFP), a disk drive, a USB drive, a storage device using IEEE 1394, a CD/DVD drive, a Web log, a Web site, a Uniform Resource Locator, a File Transfer Protocol site, and a Hypertext Transfer Protocol site.

12. The method of claim 8, wherein receiving an indication to initiate a home flow project comprises recognizing at least one of the following: screen-button selections, data entry, bar codes, signatures, digital signatures, files, images, phone numbers, pictures, numbers, marks, fingerprints, iris patterns, and voice patterns.

13. The method of claim 8, further comprising one of the following: storing the delivery instructions, requesting and receiving delivery instructions through a user interface, receiving delivery instructions from a scanned image, receiving delivery instructions from an email message, receiving delivery instructions from an event message, and receiving delivery instructions from an electronic message.

14. A non-transitory computer readable medium having machine loadable software for executing home-flow projects on multi-function peripherals (MFPs) which,
when executed on a machine, causes the machine to perform the method comprising:
receiving an indication to execute a home flow project;
identifying, based on identification rules associated with the home flow project, a data object at a source input address;
extracting a data object from a source input address, wherein digital media is stored at the source input address; and
sending, based on delivery instructions, the data object to a plurality of destination input addresses, wherein digital media is stored at the destination input addresses,
wherein the identification rules evaluate data objects at the source input address to determine which, if any, data object meets a semantic description of a data object type corresponding to the home flow project.

15. A method of defining home flow profiles, the method comprising: initiating a home flow profile, the home flow profile being associated with a data object type;
associating a source input address with the home flow profile, the associating comprising information sufficient to locate a first input device, the first input device configured to receive instances of the data object type;
associating a plurality of identification rules with the home flow profile, the rules evaluating data objects at the source input address to determine which, if any, data object meets a semantic description of the data object type;
associating a destination input address with the home flow profile, wherein the association comprises information sufficient to locate a second input device, the second input device configured to receive instances of the data object type; and
storing the home flow profile in a data storage.

16. A system for executing a home flow profile, comprising:
a device configured to receive a home flow specification identifying a home flow profile, wherein the home flow profile identifies at least one source input location, wherein the source input location stores digital media, the home flow specification further identifying at least one destination input location, wherein the at least one destination input is capable of storing the digital media;

an execution module configured to read the home flow specification and further configured to identify, based on a plurality of identification rules associated with the home flow profile, a data object at the at least one source input location, to extract the identified data object from the at least one source input location and to send the identified data object to the at least one destination input location; and a computing device configured to execute at least the execution module, wherein the identification rules evaluate data objects at the at least one source input location to determine which, if any, data object meets a semantic description of a data object type corresponding to the home flow profile.

17. The system of claim 16, further comprising a configuration module configured to define the home flow profile comprising the associated identification rules.

18. The system of claim 16, wherein the home flow profile identifies a set of possible source input locations, wherein the respective source input locations are associated with a respective subset of the identification rules based on the applicability of the respective identification rules to the respective source input locations, and wherein the home flow specification identifies a subset of the set of possible source input locations.

19. The system of claim 16, wherein the configuration module defines the home flow profile via processing information received from at least one of the following: a home flow editor application, a scanned form, an email, a user interface, an event message, a voice command, a Web-enabled user interface, and a local client.

20. The system of claim 16, wherein the home flow profile comprises delivery instructions for sending the digital media to the at least one destination input location, and wherein the execution module is configured to send the digital media to the at least one destination input location based on the delivery instructions.

21. The system of claim 20, wherein the home flow profile further identifies a set of possible destination input locations, wherein the respective destination input locations are associated with a respective subset of the delivery instructions based on the applicability of the respective delivery instructions to the respective destination input locations, and wherein the home flow specification identifies a subset of the set of possible destination input locations.

22. The system of claim 16, wherein the device receives the home flow specification via at least one of the following: a home flow editor application, a scanned form, an email, a user interface, an event message, a voice command, a Web-enabled user interface, and a local client.

23. The system of claim 16, wherein the at least one source input location and the at least one destination input location are associated, respectively, with at least one from the following: a scanner, a fax, a multi-function peripheral (MFP), a disk drive, a USB drive, a storage device using IEEE 1394, a CD/DVD drive, a Web log, a Web site, a Uniform Resource Locator, a File Transfer Protocol site, and a Hypertext Transfer Protocol site.

24. The method of claim 1, wherein the destination input address is chosen based upon application of the identification rules.

* * * * *